Feb. 18, 1936.  M. E. LEEDS  2,031,050

MEASURING SYSTEM

Filed Dec. 2, 1932  2 Sheets-Sheet 1

INVENTOR.
Morris E. Leeds
BY
Cornelius D. Ehret
his ATTORNEY.

Feb. 18, 1936.  M. E. LEEDS  2,031,050
MEASURING SYSTEM
Filed Dec. 2, 1932   2 Sheets-Sheet 2
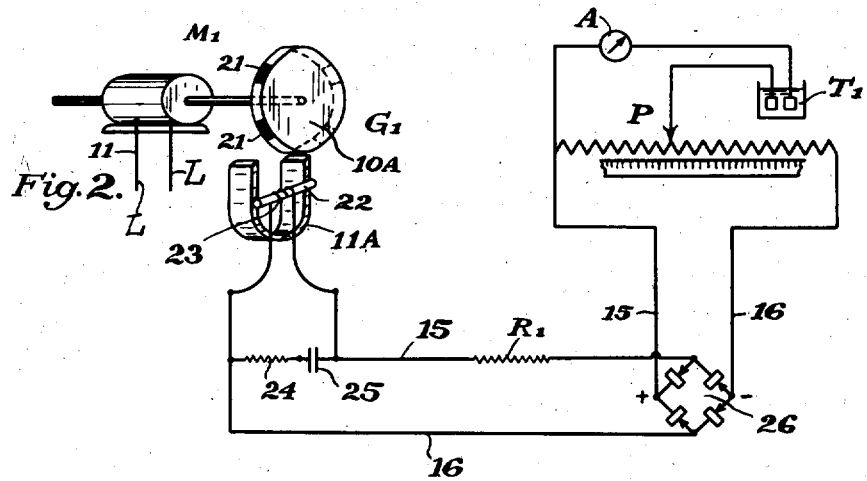
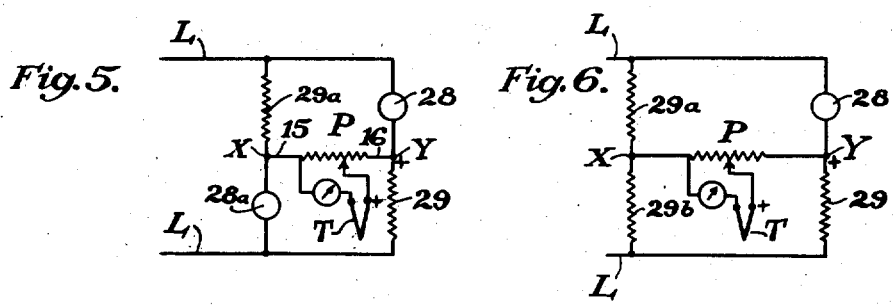
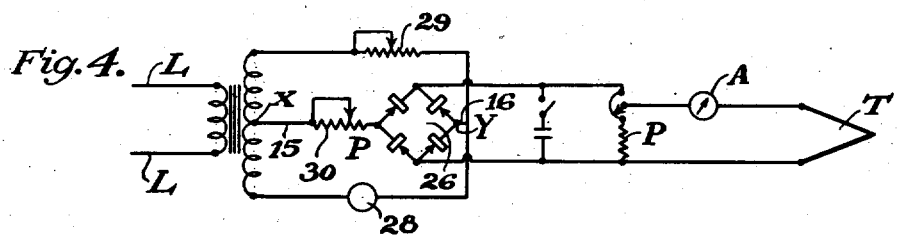
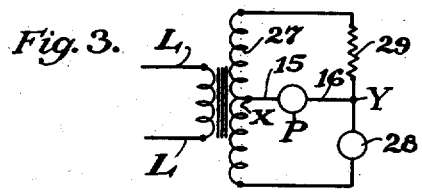
INVENTOR.
Morris E. Leeds
BY
Cornelius L. Ehret
his ATTORNEY.

Patented Feb. 18, 1936

2,031,050

UNITED STATES PATENT OFFICE 2,031,050

MEASURING SYSTEM

Morris E. Leeds, Philadelphia, Pa., assignor to Leeds & Northrup Company, Philadelphia, Pa., a corporation of Pennsylvania Application December 2, 1932, Serial No. 645,333

8 Claims. (Cl. 171—95)

My invention relates to electrical measuring and particularly to arrangements for recording and/or controlling chemical, physical, electrical and other conditions.

Heretofore in measuring systems, as recording potentiometer systems, for example, batteries have been used to supply the measuring circuit, requiring care and replacement of the batteries and frequent checking against a standard cell for recalibration of the system.

In accordance with my invention, a current or voltage suitable for precise measurements is derived from a commercial source of current, with high constancy of magnitude of the derived current notwithstanding the usual and substantial fluctuations of the commercial source.

My invention also comprehends the various methods and systems hereinafter described and claimed.

For an understanding of my invention, and for illustration of various embodiments thereof, reference is to be had to the accompanying drawings, in which:

Fig. 2 illustrates a modification of the invention.

Figs. 3 to 6 illustrate other modifications.

Figure 1:
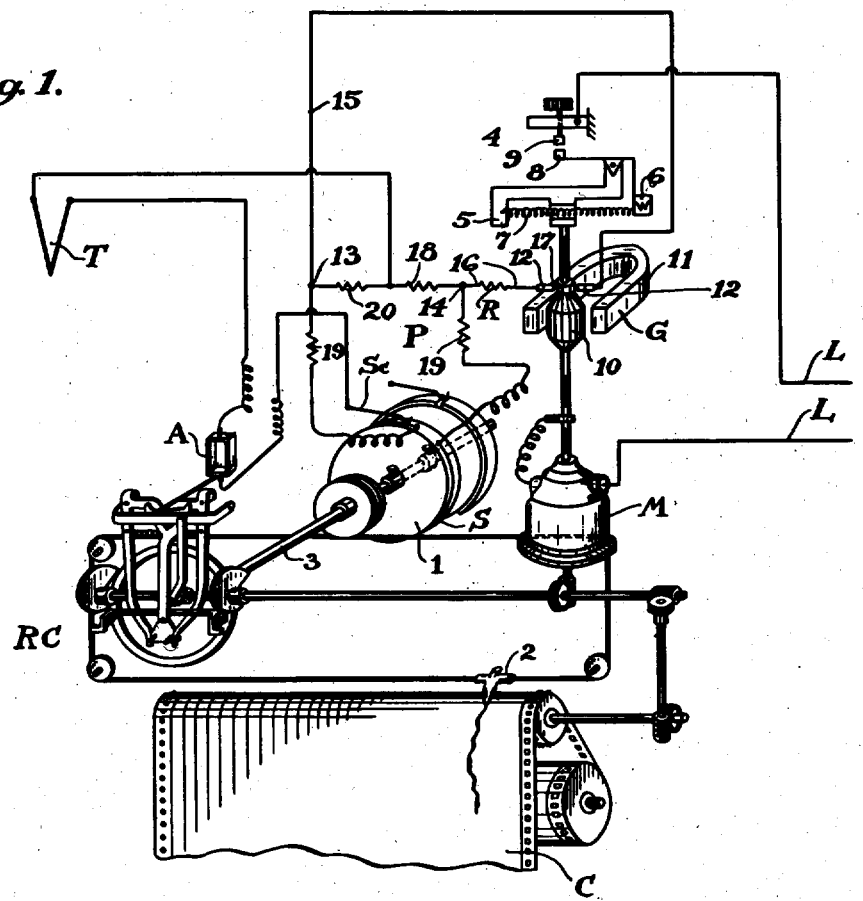
Fig. 1 illustrates, diagrammatically, a recording system utilizing the invention.

Referring to Fig. 1, the network P is illustrative of a potentiometer network, which for purpose of explaining one application of the invention, is utilized to measure and record the voltage and variations in voltage of the thermocouple T, the magnitude of the voltage varying in accordance with the condition under measurement as temperature, turbidity, smoke density, etc.

The voltage developed by the thermocouple is balanced against a voltage in the potentiometer circuit which is adjusted by relative movement of the slide wire S and its contact Sc until there is no deflection of galvanometer A. Specifically, in the automatic recording system shown, which utilizes apparatus of the type disclosed in my Patent No. 1,125,699 the disc 1 is rotated in one direction or the other, upon deflection of the needle, until balance is effected. The marker or pen 2 is driven from the shaft 3 carrying disc 1 so that it indicates and records the variations on chart C which is provided with a suitable graduated scale.

The readings taken or record made are not accurate unless the current through the slidewire S is maintained constant at the magnitude or value for which the instrument was calibrated. Heretofore batteries, primary or secondary, have been universally utilized to supply the potentiometer current. The batteries required attention at frequent intervals; particularly it was necessary frequently to check their voltage against that of a standard cell, and readjust the battery current accordingly. This when done manually introduced the possibility of improper adjustment by the operator. The apparatus was often provided with mechanism generally of the type disclosed in my aforesaid patent for periodically checking the battery voltage and readjusting the potentiometer current but this mechanism substantially added to the cost and complexity of the apparatus. It did not eliminate the need for attending to the batteries and their replacement.

Previously, it has not been considered feasible to use commercial sources of current, as the usual power or lighting circuits, because the changes in current through the potentiometer slide wire due to fluctuations of the source arising from varying load conditions, poor regulation, etc., would produce voltage changes of the order of the changes to be recorded or measured.

In accordance with my invention, the measuring circuit derives its current from a commercial source, and notwithstanding the usual and substantial variations of the commercial source, the current through the potentiometer slide wire, or equivalent, remains constant, or in any event varies within such narrow limits that it does not preclude highly accurate measurements.

The motor M is energized from the line LL from a commercial source of current, either direct or alternating. The speed of the motor is held constant by a suitable high-precision governor mechanism 4, which may for example be generally of the type shown in my Patent No. 1,476,824. Briefly the support 5 rotated by the motor M carries a centrifugal member 6 which for speed in excess of a magnitude predetermined by adjustment or selection of spring 7, moves to separate contacts 8, 9 and so reduce or cut off the current to the motor. In operation, the contacts 8, 9 rapidly separate and reclose holding the motor speed constant at the desired value despite substantial fluctuations in voltage of the supply line L, L. For example, the line voltage may vary as much as from 100 to 120 volts and notwithstanding the substantial variation in voltage, the speed of motor M is held constant within narrow limits, as for example .1%.

Motor M is utilized to drive a small generator G; as indicated, the armature 10 of the generator may be mounted upon the shaft of motor M. The field excitation is preferably constant and therefore conveniently provided by the permanent field magnet 11. Equivalent arrangements may of course be used to provide field excitation. For clarity, the disclosure is diagrammatic and hence the usual pole-pieces, supports, etc., have been omitted.

The generator brushes 12, 12 are connected to the terminals 13, 14 of the potentiometer circuit by conductors 15, 16 which in accordance with prior practice would be connected to batteries. As the speed of the generator armature is held constant, the voltage it impresses upon terminal 13, 14 remains constant and therefore the current through the slide wire is the same regardless of substantial fluctuations of voltage of line L, L. There is no longer need for batteries, standard cell, battery-current regulating resistance, etc., and the readings are always accurate whereas with batteries the accuracy fell off between successive checkings and recalibrations.

Further to insure high constancy of voltage applied to or current through the slide wire, there is included in series with the generator armature, resistor R whose resistance is high compared to the sum total of any variations in resistance in the system including the armature winding, and the various elements of the potentiometer system. Accordingly, the generator G is constructed or operated to produce a voltage at its brushes which is substantially higher than the voltage required at the potentiometer terminals.

The relatively high value of resistor R minimizes the effect of any variation in resistance between the brushes 12 and the armature commutator 17, it also renders insubstantial the effect of temperature upon the resistance of the armature winding, or upon the cold-junction compensating resistor 18, insofar as it affects the slide wire current.

With the exception of 18, the other resistors of the system i. e., slide wire S, end coils 19—19, resistance 20, and resistor R, are of an alloy, as "manganin", having a negligible temperature coefficient of resistance.

The armature 10 may be wound with copper conductor, because any change in output due to temperature change is avoided by the high magnitude of resistance of resistor R. Specifically, the resistance of R should be great compared to the sum of the resistances of the armature winding, and of the compensating coil 18, the two elements whose resistance varies or may vary appreciably with temperature.

Simply by way of example, and for measurement of thermocouple voltages up to 100 millivolts, the generator G is operated to produce 10 volts, and the values of resistors R, S, 18, 19, and 20 are respectively, 1000, 18, 20, 2 and 2, ohms; the voltage difference between 13 and 14 remains 122 millivolts, even though the voltage of the supply source varies as much as ±10%, and for all usual variations of temperature of the atmosphere.

As the current in the slide wire usually need only be a small fraction of an ampere, for example, 5 milliamperes, the motor M and generator G can be small, for example, the generator need only supply about 0.1 watt for the particular system specifically described above. The motor M for driving generator G can in fact, for the recorder-controller RC shown in Fig. 1, be the same motor that is used to actuate the step-by-step mechanism of the recorder which effects self-balancing action of the system and moves the recorder pen.

In the modification shown in Fig. 2, motor M1 is connected to a commercial source of current L, L. Its speed may be held constant by a suitable governor, as in the system of Fig. 1, or if the source L, L supplies alternating current at reasonably constant frequency, the motor can be of the induction type or of the synchronous type, without a governor. The motor M is utilized to drive the rotor 10A of an alternator. As shown, the rotor may comprise a non-magnetic disc with magnetic elements 21 spaced peripherally thereof to comprise the rotor of an inductor-alternator.

The field may be furnished by a permanent magnet 11a, which is associated with the shunt yoke 22 on which is disposed the inductor coil 23. There is preferably provided a small, adjustable air gap between yoke 22 and field magnet 11a.

An alternating voltage is generated in coil 23 as the result of the varying reluctance of the magnetic circuit caused by rotation of disc 10a with its armature elements 21. If motor M is provided with a governor, or if it is of the synchronous type, the generated voltage is constant notwithstanding fluctuations of voltage of the commercial source of supply. If the frequency of the source changes, the speed of synchronous motor M1 will change and consequently the voltage across 23 will change but this is compensated for, by arrangements hereinafter described for the usual variations of frequency of modern commercial sources of alternating current. When the motor M is of the induction type, the voltage across 23 is compensated for both change of frequency and voltage of source L, L.

To minimize the effect of imperfect governing of motor M, or lack of constancy of frequency and/or voltage of the source L, L, there is provided a shunt circuit including resistance 24 in series with a capacity 25. The voltage induced in coil 23 and the frequency of that voltage both vary directly with the speed of motor M. If the frequency increases because of increase in speed of motor M, for any reason, the reactance of condenser 25 is less and consequently more current flows through the shunt circuit, increasing the load on the generator G and causing its voltage to drop. Conversely, if the frequency decreases, less current flows through the shunt circuit and the voltage across conductors 15, 16 increases. Consequently, the output voltage is held constant by the compensating network despite variations of the rotor speed.

As for measurement of direct current voltages, the current through the potentiometer P should be direct current, a suitable rectifier 26 is interposed in circuit between generator G1 and the measuring network. As shown the rectifier elements, preferably of the copper-oxide type, or equivalent, may be arranged in bridge form. In effect, the rectifier 26 performs the functions of the commutator of generator G of Fig. 1.

To minimize the effect of change of resistance of the rectifier with temperature, there is provided resistor R1 of resistance which is high compared to any change in the resistance of the rectifier. In general, resistor R1 serves the same purposes as the resistor R of the system of Fig. 1.

The output terminals of the rectifier are connected to the potentiometer P. The responsive element T1, may be a thermocouple, in Fig 1, an ion-concentration cell as indicated, or any other element suitable for the particular conditions of measurement. This system like the system of Fig. 1, provides for supply of constant current or voltage to a measuring circuit from a commercial source, obviating the need for batteries and attendant disadvantages.

Figure 7:
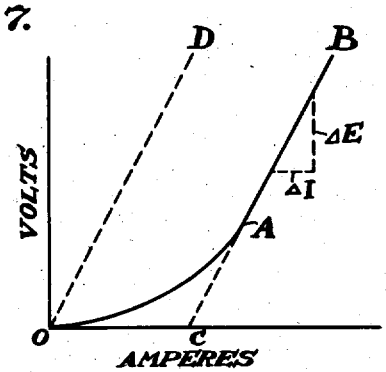
Fig. 7 shows curves referred to in explanation of Figs. 3 to 6.

Referring to Fig. 7, the curve OAB is characteristic of the volt-ampere curve of a trungsten filament lamp. Over a considerable range, the curve is linear, and the intercept C of the projection of the linear part of the curve with the current axis is substantially displaced from the origin O, specifically, the current value at C is approximately 50% of the normal rated current of the lamp.

Referring to Fig. 3, for an understanding of the principles involved in the utilization of this characteristic in the supply of constant current to a measuring circuit, device, or the like, the terminals of the transformer secondary 27 are connected through a lamp 28, or other device, having the aforesaid volt-ampere characteristic and a resistance 29 of the usual type whose characteristic OD, Fig. 7 is linear throughout. The device P is connected between neutral tap of the winding 27 and the common connection of lamp 28 and resistance 29. Clearly, the current flowing through P is equal to the difference between the currents drawn by the resistor 29 and lamp 28.

Resistor 29 is chosen so that its resistance is equal to the slope of the linear portion of the characteristic curve of lamp 28, i. e., so that its curve OD is parallel to the linear portion AB of curve OAB. The difference in current flowing through P, if the resistance of P is negligible is represented by the horizontal distance between the curves, and is therefore constant for all values of current lying within the range AB of the lamp characteristic.

Regardless of the chosen value of fixed resistance of P, the current through it remains constant so long as the lamp is operated over the linear portion of its characteristic curve, from which it follows that for substantial variation in voltage of the commercial source of supply L, L, the current through P remains constant, the simultaneous increase or decrease of current within the zone AB, Fig. 7 being without effect upon the current difference.

Fig. 4 is an elaboration of the fundamental circuit of Fig. 3 for adapting it for measurement of small direct currents by the potentiometer method. As in Fig. 2, a rectifier 26 is interposed between the source of constant voltage and the measuring circuit P. In initially setting up the installation, the resistance 29 is adjusted until the current in the potentiometer does not vary for substantial change in voltage of the supply L, L, and then resistance 30 is adjusted until the current through the potentiometer corresponds to that for which it is calibrated. The system is then in condition for operation without need for frequent checking, etc., as was necessary with batteries.

The arrangement shown in Fig. 5 also affords constant current through the measuring circuit leg P of the network. As shown, it is suitable for use with a commercial source of direct current, and may be used with a commercial source of alternating current without need for a transformer with split secondary. In the latter case, for direct current measurements, a rectifier should be used generally as shown in Fig. 4; for alternating current measurements, an alternating current galvanometer is used. In both cases, the current through the measuring circuit as supplied by the commercial source of current remains constant so long as the lamps 28, 28a are operated on the linear portions of their characteristics and provided that the resistance of the associated resistors 29, 29a is equal to the slopes of the portions AB of the curves of the lamps.

Fig. 6 is similar to Fig. 5 except that lamp 28a is replaced by another resistor 29b. It is suited for both alternating and direct current sources of supply subject to the same conditions as Fig. 5.

An instrument or system exemplified by either Fig. 5 or Fig. 6 may include rectifying means, generically in accord with Fig. 4 or otherwise, and so be utilizable for measurements of or in terms of direct current or voltage, whether the source of current connected to L, L be alternating or unidirectional. The presence of the rectifying means when a direct or uni-directional source is employed renders its poling a matter of indifference; without the rectifying means, Figs. 5 or 6, a particular poling of a direct or uni-directional source is essential, as indicated by the + (or —) markings.

The arrangements of Figs. 3 (4), 5 and 6 afford different values of current between the points X—Y, as indicated by the formulæ below:

Fig. 3 (4)  $i = \frac{I_0 R}{R+2r}$   $i$ = current through $P$
$I_0$ = zero intercept of lamp current (OC of Fig. 7)

Fig. 5  $i = \frac{I_0 R}{R+r}$   $R$ = resistance of 29 = $\frac{\Delta E}{\Delta I}$ of Fig. 7
$r$ = resistance between $X-Y$ (through $P$)

Fig. 6  $i = \frac{I_0 R}{2(R+r)}$

It is characteristic of all the systems disclosed and described, that a current or voltage suitably constant for precision measurements can be obtained from a commercial source of direct or alternating current.

What I claim is:

1. In the art of electrical measurement, the method which comprises deriving current from a commercial source of current, impressing said derived current upon a measuring circuit whose resistance is constant irrespective of the magnitude of current traversing it, maintaining the magnitude of the derived current substantially constant notwithstanding substantial variation in voltage of said commercial source, and the changes in magnitude of a condition under measurement, and balancing a voltage produced independently of said current and varying in accordance with changes in magnitude of said condition against a voltage of constant magnitude produced in said measuring circuit by said derived current.

2. In the art of potentiometric measurements, the method of producing a potentiometer current of constant magnitude which comprises driving a motor-generator from a commercial power line, maintaining the output voltage of said generator substantially constant notwithstanding substantial variations in voltage of said line, impressing the generator voltage upon a potentiometer circuit whose resistance is constant irrespective of the magnitude of current traversing it, and balancing a voltage varying in accordance with a condition under measurement against a voltage in said potentiometer circuit produced by flow of the generator current therein.

3. In the art of potentiometric measurements, the method of producing a potentiometer current of constant magnitude which comprises driving a motor-generator from a commercial power line, maintaining the output voltage of said generator substantially constant notwithstanding substantial variations in voltage of said line and variations in magnitude of the condition under measurement, and impressing the generator voltage upon the potentiometer circuit through resistance of magnitude which is substantially constant and high relative to any variations in resistance of said circuit.

4. In the art of potentiometric measurements, the method of producing a potentiometric current of constant magnitude which comprises driving a motor-generator from a commercial source of current, maintaining the speed of said generator substantially constant notwithstanding substantial variations in voltage of said source and variations in magnitude of the condition under measurement, and impressing the generator voltage upon a measuring circuit of substantially constant resistance through resistance of magnitude which is substantially constant and high relative to any incidental variation in resistance of said circuit due to change of temperature or other condition of operation.

5. In the art of potentiometric measurement, the method of producing a potentiometric current of constant magnitude which comprises deriving a direct current voltage from a commercial source of current, maintaining the magnitude of said voltage substantially constant notwithstanding substantial variation in voltage of said commercial source and variations in magnitude of the condition under measurement, producing by said derived voltage flow of current through a path including in series a measuring circuit of substantially constant resistance and resistance whose magnitude is substantially constant and high relative to any change in the resistance of said path due to change of temperature or other condition of operation.

6. In the art of potentiometric measurement, the method of producing a potentiometric current of constant magnitude which comprises deriving from a commercial source of current a direct current voltage substantially higher than required, maintaining the magnitude of said voltage substantially constant, notwithstanding substantial variation in voltage of said commercial source and variations in magnitude of the condition under measurement, and impressing said derived voltage upon a measuring circuit through interposed resistance of magnitude which is substantially independent of variations of temperature, suitably high to reduce the voltage across the measuring circuit to desired value and high relative to any incidental variation in resistance of said measuring circuit due to change of temperature or other condition of operation.

7. A measuring system comprising a measuring circuit of substantially constant resistance, a commercial source of current subject to substantial voltage variations, means for deriving a direct current voltage from said source and impressing it upon said measuring circuit including means for maintaining the magnitude of said derived voltage substantially constant, and resistance in series with said circuit of magnitude which is substantially constant despite variations of temperature and high relative to any incidental variations in resistance of said circuit.

8. A measuring system comprising a measuring circuit, a commercial source of current, a motor energized therefrom, a generator driven by said motor and supplying current to said measuring circuit, and resistance in circuit between said generator and said measuring circuit of magnitude which is substantially constant and high relative to any incidental variation of resistance of said circuit due to change of temperature or other operating condition.

MORRIS E. LEEDS.